US005172293A

United States Patent [19]

Matsumoto et al.

[11] Patent Number: 5,172,293

[45] Date of Patent: Dec. 15, 1992

[54] CIRCUIT BREAKER WITH LEAKAGE CURRENT DETECTING FUNCTIONS

[75] Inventors: Shigeru Matsumoto; Toshihiro Akiyama, both of Fukuyama, Japan

[73] Assignee: Mitsubishi Denki Kabushiki Kaisha, Tokyo, Japan

[21] Appl. No.: 639,528

[22] Filed: Jan. 10, 1991

[30] Foreign Application Priority Data

Jan. 12, 1990 [JP] Japan ........................................ 2-5165

[51] Int. Cl.[5] ................................................ H02H 3/08

[52] U.S. Cl. ........................................ 361/93; 361/96; 340/663

[58] Field of Search ........................ 361/42, 44, 46, 48, 361/86, 87, 91, 102, 93; 335/18, 19; 340/663

[56] References Cited

U.S. PATENT DOCUMENTS 3,745,414 7/1973 Frantti et al. .......................... 317/18
4,338,647 7/1982 Wilson et al. .......................... 361/96
4,831,496 5/1989 Brant et al. .......................... 361/394

FOREIGN PATENT DOCUMENTS 0059890 9/1982 European Pat. Off. .
0264314 4/1988 European Pat. Off. .
0362846 4/1990 European Pat. Off. .
2-239533 9/1990 Japan .

*Primary Examiner*—Todd E. DeBoer
*Attorney, Agent, or Firm*—Burns, Doane, Swecker & Mathis

[57] ABSTRACT

A circuit breaker has leakage current detecting functions, that is leakage detection, leakage alarm and disconnection the circuit in the leakage state from the power source side; in order to conduct such functions, the circuit breaker comprises a magnetic release device for disconnecting a circuit in the leakage state, a zero-phase current transformer for detecting a leakage current, a sensitivity selector, an amplifier and a leakage relay for issuing a leakage alarm signal.

5 Claims, 4 Drawing Sheets

CIRCUIT BREAKER WITH LEAKAGE CURRENT DETECTING FUNCTIONS

FIELD OF THE INVENTION AND RELATED ART STATEMENT

1. Field of the Invention

The present invention relates to a circuit breaker with leakage current detecting functions which is provided with leakage alarm/trip functions in addition to the functions of protecting against overloads and short-circuit which are fundamental functions of the circuit breaker.

2. Description of the Related Art

A conventional circuit breaker with a leakage alarm function has been disclosed, for instance, in Japanese patent application No. Hei 1-58530 (Tokugan Hei 1-58530) which was filed by the same assignee. An essential part thereof is shown in FIG. 3 and FIG. 4. FIG. 3 is a perspective view of the conventional circuit breaker 1. FIG. 4 is a circuit diagram of the circuit breaker 1 shown in FIG. 3.

The conventional circuit breaker 1 is provided with functions of protecting against overloads and shortcircuits. As shown in FIG. 3, a casing 2 comprises a base part 2*a* and a cover part 2*b*. The casing 2 further comprises input side terminals 3 of power source side and output side terminals 4 of load side. The cover part 2*b* has a top face panel 1*a* having a square hole 1*b* for providing access to the handle 9. A leakage indication lamp 10 is provided in a hole 10*a* in the top face panel 1*a* positioned near the handle 9 in a manner to be observed through the hole 10*a*. A reset button 11 and a test button 12 protrude through holes in the top face panel 1*a* near the handle 9 and the leakage indication lamp 10.

As shown in FIG. 4, the casing 2 of the conventional circuit breaker 1 contains a zero-phase current transformer 5, a sensitivity selector 6, an amplifier 7 and a leakage relay 8. When the leakage relay 8 is actuated by an amplified signal of the amplifier 7, the above-mentioned leakage indication lamp 10 is lit and the lit state is held to indicate the existence of leakage. The latched or held indication of leakage indication state of the leakage relay 8 and the leakage indication lamp 10 are reset by pushing the reset button 11. The test button 12 is used when the user wished to test the system by simulating the leakage state. The leakage relay 8 issues an alarm signal through leakage alarm output lines 13 to an alarm device, as shown schematically in FIG. 4.

When a leakage in the circuit connected to the output side terminals 4 of the load side occurs, the zero-phase current transformer 5 detects the leakage current and issues an output signal. The output signal of the zero-phase current transformer 5 is amplified by the amplifier 7 to provide an amplified signal. The amplified signal drives the leakage relay 8 to issue an alarm signal for the alarm device. At the same time the leakage indication lamp 10 is lit to indicate the existence of leakage. The leakage relay 8 and the leakage indication lamp 10 are held in a leakage detection state by means of known latching circuitry. The latch leakage indication state in the conventional circuit breaker 1 is reset by pushing the reset button 11 or by breaking the power supply to the input side terminals 3.

In the above-mentioned conventional circuit breaker 1 having only a leakage alarm function, when a leakage in the circuit connected to the circuit breaker 1 occurs, the circuit breaker 1 issues the alarm signal to operate the alarm device connected to the leakage alarm output lines 13. An operator who has heard the alarm/operates the handle 9 of the circuit breaker 1 for disconnecting the circuit experiencing a leakage from the power source. Therefore, it necessarily takes a good deal of time to disconnect the leaking circuit from the power source with the conventional circuit breaker 1. Thus, the conventional circuit breaker 1 has a possibility of inducing the problem that a circuit breaking by the circuit breaker 1 is unduly deferred, thereby damaging the circuit and its components.

OBJECT AND SUMMARY OF THE INVENTION

An object of the present invention is to offer an improved circuit breaker which can automatically conduct a breaking operation in response to the detection of leakage, and which has a changeover means for switching between (i) a first state in which it has only a leakage alarm function and (ii) a second state in which it has a leakage alarm function and a breaking function.

In order to achieve the above-mentioned object, the circuit breaker with leakage current detecting functions of the present invention comprises:

a casing;

a zero-phase current transformer contained in the casing for detecting a leakage current;

a leakage relay contained in the casing for issuing a leakage alarm signal in response to the output signal of the zero-phase current transformer;

a magnetic release device which is contained in the casing, and is to be operated by the output signal of the zero-phase current transformer and is further used to disconnect a circuit in a leakage state from the power source; and alarm/trip changeover terminals for switching between a leakage alarm mode and a leakage alarm with breaking mode.

While the novel features of the invention are set forth particularly in the appended claims, the invention, both as to organization and content, will be better understood and appreciated, along with other objects and features thereof, from the following detailed description taken in conjunction with the drawings.

It will be recognized that some or all of the Figures are schematic representations for purposes of illustration and do not necessarily depict the actual relative sizes or locations of the elements shown.

DESCRIPTION OF THE PREFERRED EMBODIMENTS

Figure 1:
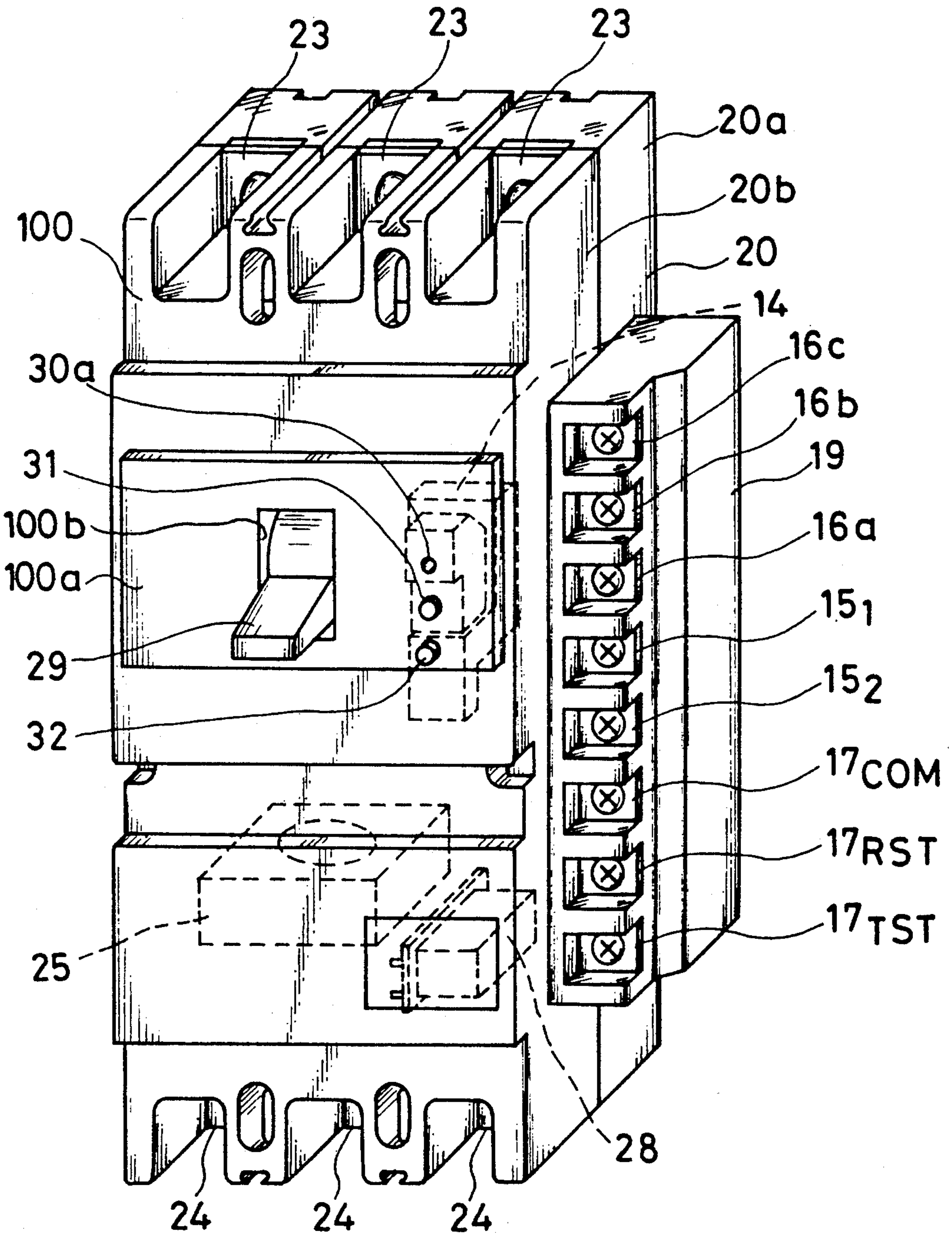
FIG. 1 is a perspective view of an embodiment of a circuit breaker with leakage current detecting functions of the present invention.
Figure 2:
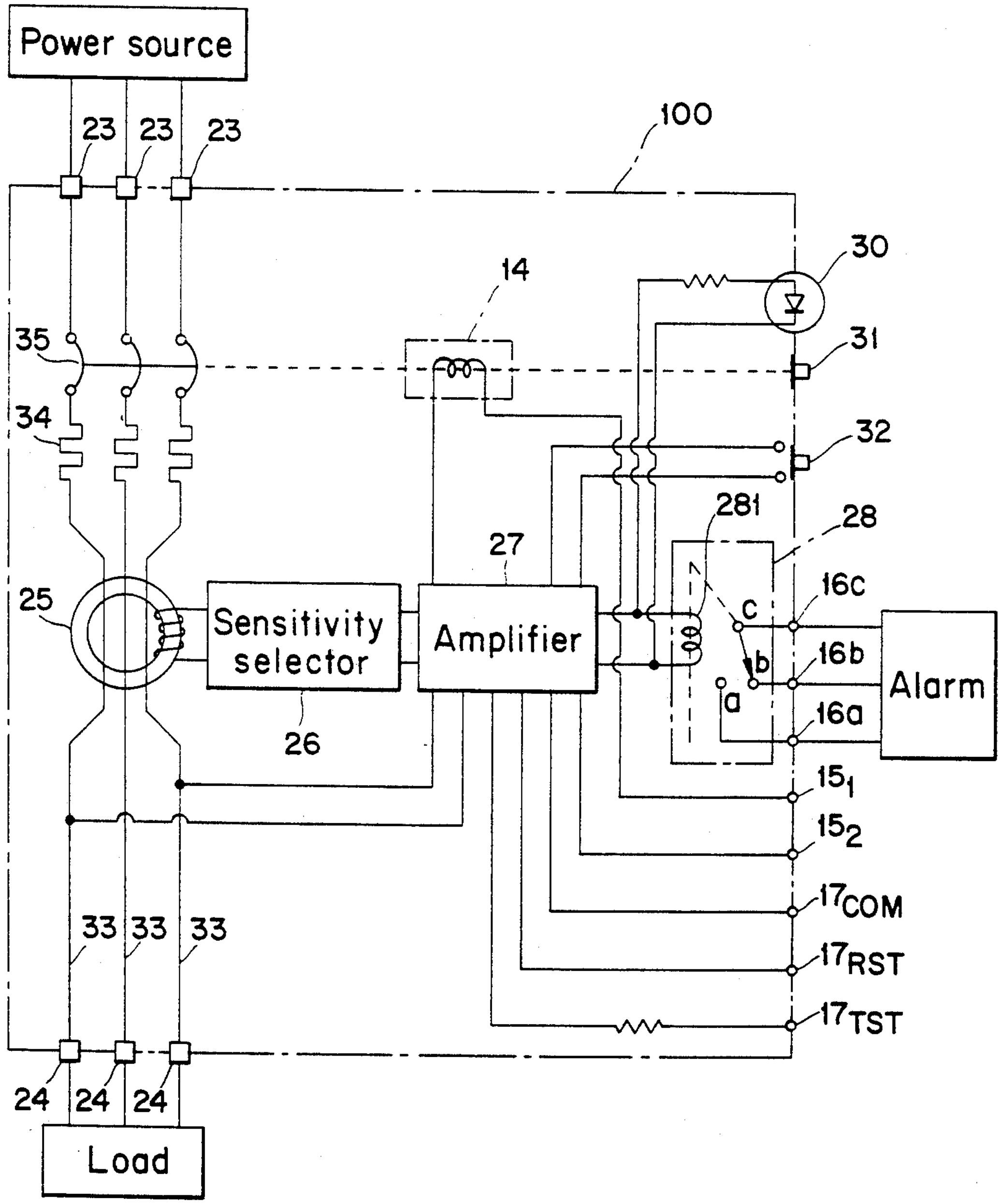
FIG. 2 is a circuit diagram of the embodiment of the circuit breaker with leakage current detecting functions of FIG. 1.
Figure 3:
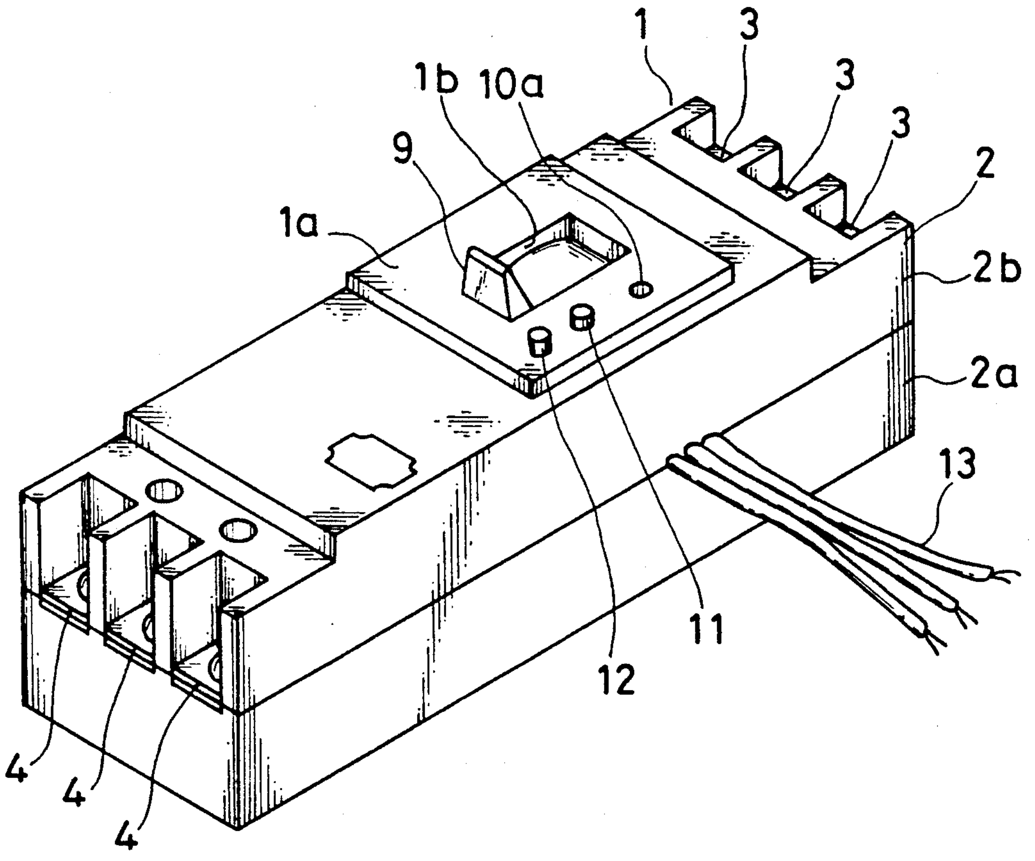
FIG. 3 (Prior Art)
FIG. 3 is the perspective view of a conventional circuit breaker.
Figure 4:
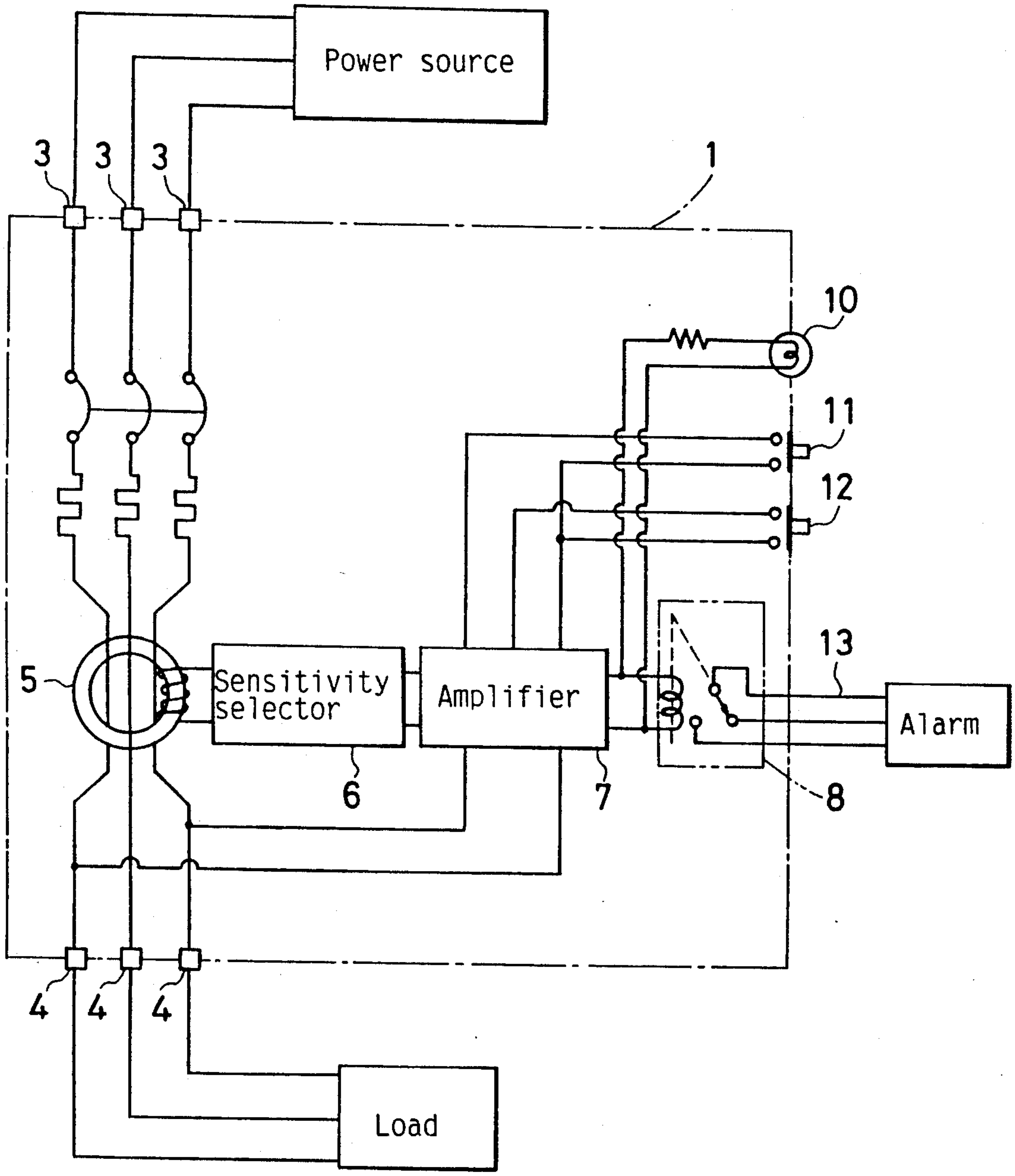
FIG. 4 (Prior Art)
FIG. 4 is the circuit diagram of the conventional circuit breaker of FIG. 3.

Hereafter, preferred embodiments of the present invention are elucidated with reference to the accompanying drawings of FIG. 1 and FIG. 2.

FIG. 1 shows a perspective view of the embodiment of the circuit breaker with leakage current detecting functions in accordance with the present invention.

The circuit breaker 100 comprises a circuit breaker part of a known configuration including fixed contacts, movable contacts, arc suppressing devices, a contact driving mechanism and a trip mechanism for tripping the contact driving mechanism in response to an overload current state or a short circuit state to break a circuit having such trouble.

As shown in FIG. 1, a casing 20 of the circuit breaker 100 comprises a base part 20*a* and a cover part 20*b*; and a terminal base part 19 is fixed to a side face of the casing 20. The casing 20 further comprises input side terminals 23, 23, 23 at its power source side and output side terminals 24, 24, 24 at its load side. The cover part 20*b* has a top face panel 100*a* having a square hole 100*b*, which is for providing access to a handle 29 connected mechanically to the contact driving mechanism. The handle 29 is operated for manually driving the contact driving mechanism. A leakage indication lamp 30 is viewable through a hole 30*a* in the top face panel 100*a* positioned near the handle 29. The leakage indication lamp 30 is provided to indicate a leakage state. A reset button 31 and a test button 32 also protrude through holes in the top face panel 100*a* near the handle 29 and the leakage indication lamp 30. The reset button 31 is provided for resetting the leakage indication state. The test button 32 is used to simulate the leakage state. The terminal base part 19 having eight (8) connection terminals is fixed to a longitudinal side face of the casing 20, as shown in FIG. 1.

FIG. 2 shows a circuit diagram of the embodiment of the circuit breaker 100 with leakage current detecting functions of FIG. 1 of the present invention.

As shown in FIG. 2, the circuit breaker 100 further comprises a zero-phase current transformer 25, a sensitivity selector 26, an amplifier 27, a leakage relay 28 and a magnetic release device 14. The zero-phase current transformer 25, which is inductively coupled to the lines 33 connected to the power source, produces an output signal when the vector sum of the currents passing through the lines 33 does not cancel. Each line 33 is connected between one of the input side terminals 23, 23, 23 and one of the output side terminals 24, 24, 24 through a short-circuit detector 35 and an overcurrent detector 34.

The sensitivity selector 26 is used for changing the sensitivity for detecting leakage currents which occur in the circuit connected to the output side terminals 24, 24, 24. When an output signal from the zero-phase current transformer 25 exceeds the predetermined leakage current value, such as 30 mA, 100 mA or 200 mA, the sensitivity selector 26 issues an output signal. The amplifier 27 amplifiers the output signal of the sensitivity selector 26, and issues an amplified output signal. The amplified signal drives the leakage relay 28, which issues an alarm signal through alarm output terminals 16*a*, 16*b*, 16*c* for the leakage current. As shown in FIG. 2, terminals 16*b* and 16*c* of the alarm output terminals 16*a*, 16*b*, 16*c* are short-circuited normally. And, the terminals 16*a* and 16*c* of the alarm output terminals 16*a*, 16*b*, 16*c* are disconnected from each other.

Alarm/trip changeover terminals $15_1$, $15_2$, which are provided on the terminal base part 19, are for connection to an alarm/trip control switch (not shown). The magnetic release device 14 and a leakage relay coil 281 of the leakage relay 28 are both connected to the amplifier 27 in the following manner: when the amplifier 27 actuates the leakage relay coil 281 of the leakage relay 28, the magnetic release device 14 is also actuated by the amplifier 27 if the terminals $15_1$ and $15_2$ of the alarm/trip changeover terminals $15_1$, $15_2$ are electrically connected to each other by the alarm/trip control switch (not shown).

When the terminal $15_1$ of the alarm/trip changeover terminals $15_1$, $15_2$ is not connected to the terminal $15_2$ of the alarm/trip changeover terminals $15_1$, $15_2$ as a result of the alarm/trip control switch which is connected to the alarm/trip changeover terminals $15_1$, $15_2$ being in an open state, the magnetic release device 14 is not actuated, whereas the leakage relay coil 281 is energized. As a result, in these circumstances, the leakage relay 28 of the circuit breaker 100 issues an alarm signal only, when a leakage is detected by the zero-phase current transformer 25.

On the other hand, when the terminal $15_1$ of the alarm/trip changeover terminals $15_1$, $15_2$ is electrically connected to the terminal $15_2$ of the alarm/trip changeover terminals $15_1$, $15_2$ by the alarm/trip control switch in a closed state, the magnetic release device 14 is actuated by the amplified signal of the amplifier 27. As a result, the magnetic release device 14 drives to trip the contact driving mechanism of the circuit breaker part, and the circuit in the leakage state is disconnected from the power source side.

The terminal base part 19 which has the alarm output terminals 16*a*, 16*b*, 16*c* and the alarm/trip changeover terminals $15_1$, $15_2$ further comprises control terminals $17_{COM}$, $17_{RST}$, $17_{TST}$ which are a reset terminal $17_{RST}$, a test terminal $17_{TST}$ and a common terminal $17_{COM}$ for remote control. The reset terminal $17_{RST}$ serves for resetting the leakage indication state by remote control to short-circuit the terminals $17_{COM}$ and $17_{RST}$. The test terminal $17_{TST}$ of the control terminals $17_{COM}$, $17_{RST}$, $17_{TST}$ is used for confirming the operation in a leakage state by making simulation by a remote control to short-circuit the terminals $17_{COM}$ and $17_{TST}$.

Next, operation of the above-mentioned circuit breaker 100 with leakage current detecting functions is described.

When a leakage in the circuit connected to the output side terminals 24 occurs, the zero-phase current transformer 25 detects the leakage current and issues an output signal. Also the sensitivity selector 26 issues an output signal to the amplifier 27 when the output signal of the zero-phase current transformer 25 goes above the predetermined leakage current. The output signal of the sensitivity selector 26 is amplified by the amplifier 27 and the amplifier 27 produces an amplified signal. The amplified signal drives the leakage relay 28, which issues an alarm signal through the alarm output terminals 16, to the alarm device as schematically shown in FIG. 2. At the same time, the magnetic release device 14 is actuated to disconnect the circuit in the leakage state from the power source if the alarm/trip changeover terminals $15_1$, $15_2$ are electrically connected by the alarm/trip changeover switch. Further the leakage indication lamp 30 is lit to indicate the existence of leakage in the circuit. The magnetic release device 14, the leakage relay 28 and the leakage indication lamp 30 are held in the leakage detection state by means of known latching circuitry in the amplifier 27. The leakage detection state of those devices is reset by either pushing the reset button 31, or by receiving a reset signal through the reset terminal $17_{RST}$ of the control terminals $17_{COM}$, $17_{RST}$, $17_{TST}$, or by breaking the power supply to the input side terminals 23.

In order to check the leakage alarm functions of the circuit breaker 100 of this embodiment, the test button 32 may be pushed, or a test signal may be applied to the test terminal $17_{TST}$ of the control terminals $17_{COM}$, $17_{RST}$, $17_{TST}$. In other words, the leakage detection state can be simulated by the circuit breaker 100 so as to check the function of the circuit breaker 100 and the related circuitry connected to the circuit breaker 100.

Apart from the above-mentioned embodiment wherein the terminal base part 19 having plural connection terminals $15_1$, $15_2$, 16a, 16b, 16c, $17_{COM}$, $17_{RST}$, $17_{TST}$ is fixed to the side face of the casing 20, a modified embodiment may be such that plural lead wires, which are colored to be distinguished by various functions thereof, lead outward from the side face of the casing.

Apart from the above-mentioned embodiment wherein the leakage indication lamp 30 is lit to indicate the existence of leakage, a modified embodiment may be such that a projectable leakage indication button is provided so as to project over the surface of the top face cover of the casing.

Although the invention has been described in its preferred form with a certain degree of particularity, it is understood that the present disclosure of the preferred form may be changed in the details of construction and the combination and arrangement of parts without departing from the spirit and the scope of the invention as hereinafter claimed.

What is claimed is:

1. A circuit breaker comprising:

a casing;

a zero-phase current transformer contained in said casing for detecting a leakage current and for producing an output signal in response to said detecting leakage current;

a leakage relay contained in said casing for issuing a leakage alarm signal in response to said output signal;

a magnetic release device which is contained in said casing, and operates in response to said output signal of said zero-phase current transformer to disconnect a circuit in a leakage state from a power source when said circuit breaker is in a leakage alarm with breaking mode of operation; and alarm/trip changeover terminals for switching between a leakage alarm mode of operation and said leakage alarm with breaking mode of operation.

2. A circuit breaker with leakage current detecting functions in accordance with claim 1, which further comprises:

a leakage current indicator for indicating detection of said leakage current by energization of said leakage relay;

a reset button for resetting said leakage relay, said magnetic release device and said leakage current indicator; and a test button for simulating a leakage state thereby to check the leakage detection operation of said circuit breaker.

3. A circuit breaker with leakage current detection functions in accordance with claim 2, which further comprises remote-control terminals which have a reset terminal for resetting said leakage relay, said magnetic release device and said leakage current indicator and a test terminal for simulating a leakage state thereby to check the leakage detection operation of said circuit breaker.

4. A circuit breaker for detecting and responding to predetermined conditions in a circuit connected to a power source, said circuit breaker comprising:

a casing;

zero phase current transformer means contained in said casing for producing an output signal in response to the presence of leakage current in said circuit;

a leakage relay contained in said casing for issuing a leakage alarm signal in response to said output signal;

a magnetic release device contained in said casing and actuable to disconnect said circuit from said power source; and alarm/trip changeover terminals for causing said circuit breaker to operate in either a first mode of operation in which said magnetic release device is actuated in response to said output signal or a second mode operation in which said magnetic release device is not actuated in response to said output signal.

5. The circuit breaker according to claim 4 wherein the alarm/trip changeover terminals control whether the magnetic release device is connected to the zero-phase current transformer means.

* * * * *